Fig.3

Inventor:
IMRE SZODFRIDT

BY: Craig & Antonelli
ATTORNEYS

United States Patent Office 3,552,235
Patented Jan. 5, 1971

3,552,235
HYDRAULIC CONTROL FOR CHANGE SPEED GEAR TRANSMISSION
Imre Szodfridt, Ditizingen, Germany, assignor to Firma Dr.-Ing. h.c.F. Porsche Kg, Stuttgart-Zuffenhausen, Germany
Filed Aug. 6, 1968, Ser. No. 750,523
Claims priority, application Germany, Aug. 16, 1967, 1,630,954
Int. Cl. B60k 21/06
U.S. Cl. 74—865                                                                    20 Claims

ABSTRACT OF THE DISCLOSURE

A hydraulic three-speed gear transmission employing two fluid operated friction clutches and two band brakes with respective double acting servo pistons. The disengaging chamber of one servo piston is disrectly connected with the engaging pressure chamber of one clutch and a pressure accumulator with a slide valve controlling the pressure thereto; the engaging pressure chamber is directly connected with the disengaging pressure chamber of the second servo piston and a second fluid accumulator selectively receiving pressure under the control of the slide valve. The slide valve is controlled according to the barometric pressure, the engine load and the engine speed, with a manual override. A pressure regulator is provided for a part of the hydraulic circuit.

BACKGROUND OF THE INVENTION

The present invention relates to a hydraulic shifting control arrangement for automotive vehicles to shift speeds in a change speed gear transmission without the interruption of power transmission or torque, particularly in combination with a hydrodynamic torque converter.

In known controls of this type, considerable difficulties are encountered with respect to the shifting process in relation to the road traction resistance, on the one hand, and the engine load, on the other hand, in connection with change speed gear transmissions.

When designing such a transmission control mechanism, a multiude of factors must be considered to obtain an optimum balance of favorable characteristics with respect to driving technique and economy; as a result, known devices have employed a substantial number of expensive shifting and control elements, the adjustment of which to certain driving ranges and conditions, necessitates additionally a control by the driver. These devices, for example British Pat. No. 931,877, usually operate by pressure modulation in such a manner that for each gear ratio a predetermined shifting pressure must be obtained, in dependence upon the control valve or other actuator affected by a centrifugal governor. In shifting units of this type, additional valve arrangements must be provided simultaneously, which valve arrangements delay or accelerate the clutch engagement when shifting from one gear to the other.

SUMMARY OF THE INVENTION

It is an object of the present invention to overcome the disadvantages of the prior art and provide a hydraulic shifting control wherein no pressure modulation is necessary for shifting the forward gears, and only a single gear changing slide valve is required for controlling the servo units for the clutch and brake coupling elements of the change speed gear transmission. With such an arrangement, the influencing characteristics determining the shifting process may be determined and mechanically transferred to the single valve.

In accordance with the present invention, one double acting brake servo unit has a first pressure chamber in fluid communication with the engaging pressure chamber of one of the clutches and a second pressure chamber in fluid communication with a pressure engaging chamber of another clutch through the intermediary of the valve, or with the disengagement pressure chamber of a second brake. As a result of such an arrangement, the servo units themselves are utilized for the shifting transition between the individual gears, whereby a multitude of the otherwise customary control and modulating valves is eliminated. The control arrangement may be further simplified for multi-speed change gear transmissions provided with at least two friction clutches and two band brakes by providing the servo units for the band brakes with double acting control pistons; the pressure chambers of the first band brake servo unit may be placed in hydraulic communication with the pressure chamber of one friction clutch and a pressure chamber of a second band brake, respectively, by means of the control valve; the other pressure chamber of the second band brake bypassing the control valve to be directly connected with the line pressure from the feed pump under the regulation of a constant pressure regulating valve.

The increase in torque occurring when employing a hydrodynamic torque converter in a composite gear transmission may be easily controlled when the servo unit of the second band brake contains a differential area piston, according to the present invention, which is double acting; the brake engagement side of the piston having a smaller area than the disengagement side of the piston. Furthermore, it is desirable to fluid connect fluid pressure accumulators, independent of each other, respectively in front of one or more pressure chambers of the first and second band brakes, with pressure being supplied thereto by means of the control valve; it is particularly advantageous to directly connect the pressure accumulators with the disengagement sides of the servo units for the band brakes, respectively, to obtain a gentle and smooth shifting transition. The device is further simplified while enhancing its operation by operatively connecting the pressure accumulator with the first band brake in fluid communication with the band brake disengagement chamber and simultaneously with the engagement pressure chamber of one of the friction clutches, and fluid connecting the second pressure accumulator with both the disengagement pressure chamber for the second band brake and with the engagement pressure chamber for the first band brake.

According to the present invention, pressure fluid is conducted to the control slide valve directly from the fluid pump, bypassing the pressure regulating valve, with the optional interposition of calibrated orifices for adjusting or synchronizing the shifting periods; with such an arrangement, a breakdown of the line pressure in the fluid circuit is avoided with certainty which contributes considerably to the operational safety of the shifting control.

The slide valve is provided with an indexing device for maintaining the valve only in predetermined fixed positions. The indexing mechanism is provided with a spring urge detent mechanism. The stepwise displacement of the control valve is further influenced mechanically by means of various controls dependent upon the various operating characteristics. Thereby, a control arrangement is obtained wherein the shifting forces effect the stepwise shifting of the gear changing control slide valve only at predetermined resultant adjusting force values. By this means, it is assured that the gear shift is executed only as a result of a desired combined effect of speed and engine load.

The actuating element for the slide valve is advantageously a centrifugal governor with governor springs disposed between its abutments, one of these abutments being drivingly connected with the adjusting sleeve of the indexing mechanism for driving the slide valve to its various positions, and another of these abutments is adjusted in dependence upon the engine load by an automatic mechanism. Accordingly, the entire device for determining and transferring the shifting factors to the gear shifting slide valve can be combined in one compact structural unit. Great accuracy is obtained in positioning the slide valve when the movable portion of the slide valve is provided with an adjusting sleeve having a plurality of grooves or indents corresponding to the number of gear ratios of the change speed gear transmission, into which grooves or indents engage locking levers of a balance spring. In particular, the dangerous neutral phase of the gear shifting process for the gear changing slide valve is quickly bridged, that is, the slide valve quickly moves from one fixed position to another fixed position.

By appropriately determining the spring combination of the adjusting sleeve, on the one hand, and the balance spring on the other hand, a proper shifting hysteresis can be obtained. The magnitude of the hysteresis may be varied by correspondingly shaping the grooves of the adjusting sleeve. Furthermore, the gear shifting slide valve with its actuating means associated therewith is advantageously under the effect of the indexing mechanism, on one side, and under the influence of a movable resiliently applied stop on the opposite side; by means of which stop the automatic shifting process may be partially or completely suspended by way of a manually operated overriding linkage.

The stop may be provided to restrict the shifting, for example, by limiting the automatic upward shifting of the gears to a specific gear and thus holding the transmission in a low gear longer than would be normal under the automatic process. By means of the manual linkage associated with the stop, it is also possible to manually shift between the various slide valve positions, corresponding for example to reverse, parking and neutral. Furthermore, the stop may be coupled with the slide valve in such a manner that the transmission may also be shifted by hand between the various forward gears, which is desirable in special cases.

BRIEF DESCRIPTION OF THE DRAWING

Further objects, features and advantages of the present invention will become more clear from the following detailed description of the drawing, which illustrates preferred embodiments of the present invention, wherein.

DETAILED DESCRIPTION OF THE DRAWING

Figures 1, 2:
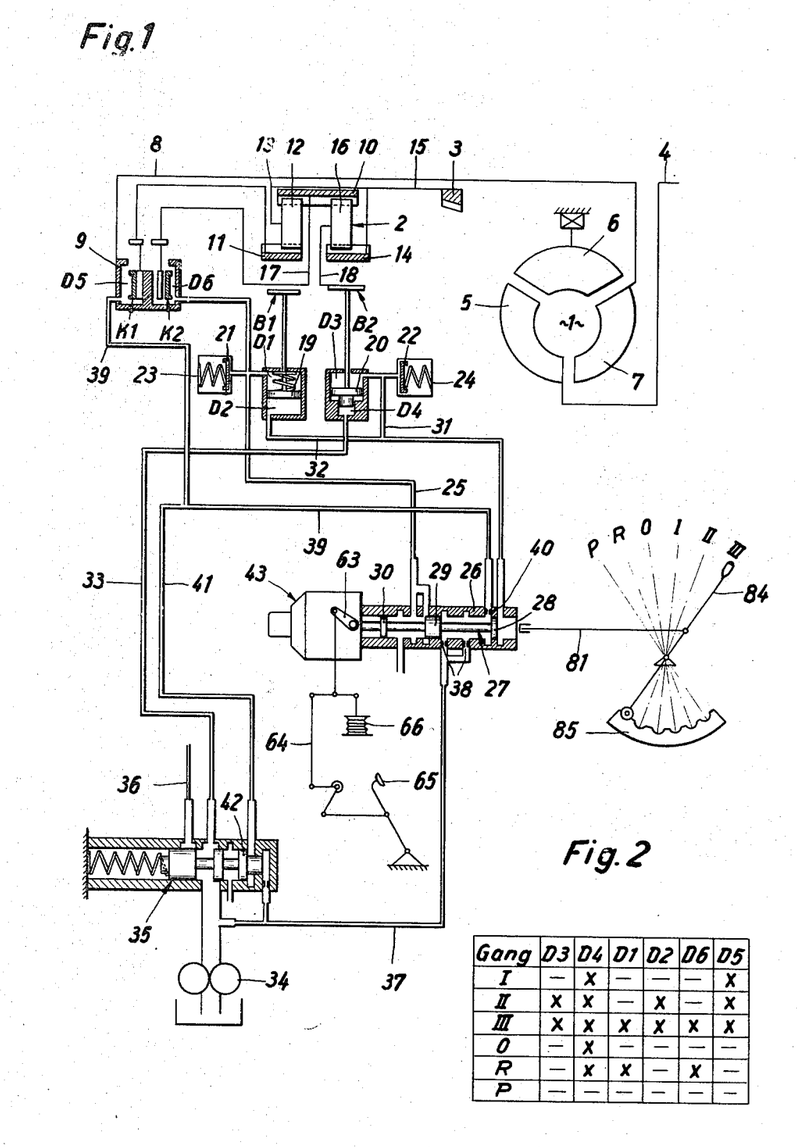
FIG. 1 is a somewhat schematic illustration of a hydrodynamic compound gear transmission for an automotive vehicle provided with a hydraulic shifting control unit automatically shifting between three forward speeds, specifically illustrating the first gear position in accordance with the present invention.
FIG. 2 is a gear shift diagram for the arrangement according to FIG. 1.

For purposes of illustration, only one symmetric half of the multi-speed compound gear transmission is shown in FIG. 1, which consists of a hydrodynamic torque converter 1 and a planetary gear arrangement 2 connected thereafter. From the output of the planetary gear arrangement 2, the rear wheels of the vehicle are driven by way of a differential drive pinion 3, which differential is not shown in detail since it is per se conventional. The torque converter 1 comprises a pump or impeller wheel 5 drivingly connected with the crank shaft 4 of the internal combustion engine (not shown); a guide wheel 6 having a free-wheeling mounting; and a turbine wheel 7 drivingly connected with the input drive shaft 8 of the planetary gear arrangement 2.

The drive shaft 8 is drivingly connected with a drum 9 containing therein friction clutches K1 and K2. The friction clutches K1 and K2 assist in operating the planetary gear arrangement 2 for producing three forward speeds and one reverse speed. The planetary gear arrangement, for this purpose, includes two identical planetary gear sets with a common sun gear 10. The ring gear 11 of the first planetary gear set is drivingly connected with the movable plate of the friction clutch K1 and is in meshing driving connection with the planet gear 12, which is rotatably mounted on planet carrier 13. Planet carrier 13 rigidly includes the ring gear 14 of the second planetary gear set, which ring gear 14 is drivingly connected with the transmission output shaft 15 carrying the pinion gear 3. The planet gears 16 of the second planetary gear set are in meshing engagement with the sun gear 10, which sun gear 10 is drivingly connected with the movable element of the friction clutch K2 by means of a shaft including the brake drum 17. A single-acting brake band B1 surrounds the brake drum 17 for engagement therewith to selectively hold the sun gear 10 stationary. A further, double-acting brake band B2 surrounds a brake drum formed by the carrier 18 for the planet gears 16 of the second planetary gear set.

Doubling acting servo units having pistons 19 and 20 are provided for engaging and disengaging the band brakes B1 and B2, respectively. The pistons 19 and 20 reciprocate within their associated cylinders forming therewith two pressure chambers D1, D2 and D3, D4 respectively. The piston 20 for the servo unit associated with the band brake B2 is a differential area piston, with the smaller area side of the piston forming the engaging pressure chamber D4 and the larger side of the piston forming the disengaging chamber D3. The friction clutches K1 and K2 are similarly provided with engaging pressure chambers D5 and D6, respectively, forming clutch servo units. Pressure acumulators are formed by pistons 21 and 22 that are spring urged in the discharge direction within cylinders 23 and 24 for direct fluid communication with the pressure chambers D1 and D3 of the band brakes, respectively. The fluid pressure accumulator formed by the cylinder 23 and the piston 21 for the band brake B1 is in direct fluid communication with both the pressure chamber D1 of the band brake B1 and with the pressure chamber D6 of the friction clutch K2, by way of pressure line 25. The pressure line 25 is also connected with the control block or housing 26 of the gear shifting control spool slide valve 27, the slide portion of which has control collars 28, 29 and 30. The fluid accumulator formed by the cylinders 24 and the piston 22 is directly fluid connected with the pressure chamber D3 of the band brake B2 as well as with the pressure chamber D2 of the band brake B1, by means of pressure lines 31 and 32. The pressure line 32 is similarly fluid connected and terminates in the control block or housing 26. The pressure chamber D4 of the band brake B2 is supplied with fluid under pressure by means of the pressure line 33 operatively connected with a source of fluid pressure, that is feed pump 34 associated with a sump, thus bypassing the gear shifting control slide valve 27. The pressure in line 33 is kept constant by the interposition of a per se conventional pressure regulating valve 35. Fluid under pressure is also supplied through the pressure regulating valve 35 by the conduit 36 to the operating chamber of the torque converter 1; for simplicity, the entire extent of the line 36 has not been illustrated. The pressure regulating valve 35 is constructed so that the fluid connection to the torque converter 1 is interrupted during the duration of a gear shifting step, so that the full pump pressure is available for the shifting process. The feed line 37 for the gear shifting control slide valve 27 is connected between the regulating valve 35 and the pump 34 and provided with calibrated nozzles or orifices 38, which will synchronize the shifting time or period, which nozzles are mounted in the control block 26.

In the gear stages or ratios I, II and III, which correspond to the three forward gear speeds, fluid pressure medium passes through the pressure line 39 from the slide valve 27 to the pressure chamber D5 of the friction clutch K1. In order to maintain the pressure constant within pressure line 39, a calibrated orifice 40 is provided in the control block 26 at the connection with the pressure line 39. A further pressure line 41 is in fluid communication and branched off from the pressure line 39 to the spring loaded control valves 42 of the pressure regulating valve 35.

FIG. 2 is a diagram of the fluid pressure medium distribution with respect to the various pressure chambers for the individual gear ratios and transmission settings, with x denoting in each case fluid being supplied under pressure to the respective pressure chamber D1–D6, and denoting respectively exhausting of the pressure chambers D1–D6. The neutral position of the transmission is indicated by O; the reverse position of the transmission is indicated by R; and the parking gear position of the transmission is denoted by P.

Figure 3:
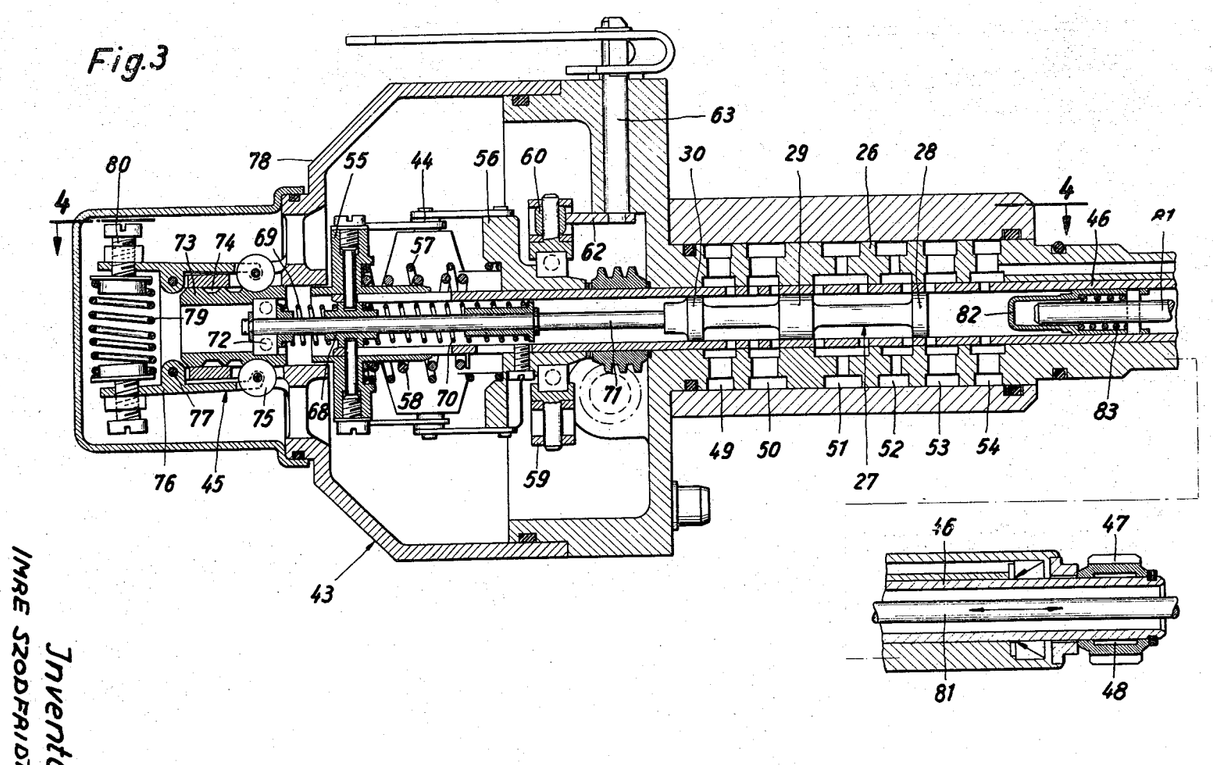
FIG. 3 is a longitudinal cross-sectional view through the shifting regulator of the transmission according to FIG. 1, on an enlarged scale.
Figure 4:
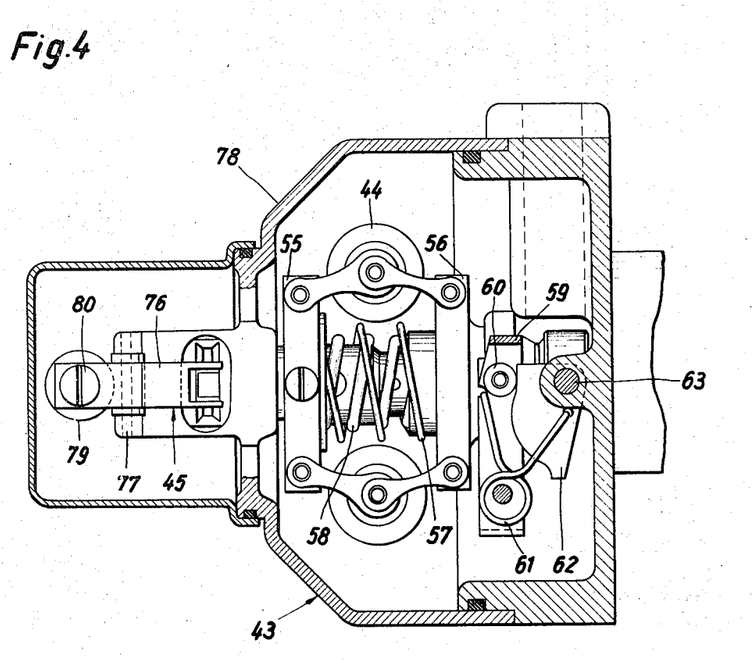
FIG. 4 is a partial cross-sectional view taken along line IV—IV.

For automatic actuation of the gear shifting slide valve 27, a shifting regulator 43 is provided, including a centrifugal governor 44 and an indexing mechanism 45, as more clearly shown in FIG. 3. The centrifugal governor 44 is driven by means of a tubular sleeve 46 drivingly connected with a gear 47, which gear 47 is in meshing engagement with a similar gear (not shown) drivingly connected with the transmission output shaft 15. The driving connection betwen the gear 47 and the sleeve 46 is provided by a slip coupling 48. The slip coupling is formed by a conventional friction shaft sleeve that will slip under a predetermined excess abnormal torque, for example when the drive wheels of the vehicle suddenly stop, to prevent the destruction of the shifting regulator 43. The tubular sleeve 46 is mounted by means of bearings within the control block 26 of the shifting governor 43 and is provided, in the plane of the control channels 49, 50, 51, 52, 53 and 54, thereof, with corresponding bores through which the pressure medium may flow between the control collars 28, 29 and 30 of the movable slide portion of the slide valve 27. The feed line 37 from the output side of the feed pump 34 is directly connected to the control channel 51; the pressure line 25 is in direct fluid communication with the channel 50; the pressure line 39 is connected with the channel 52; the pressure line 32 is connected with the channel 53; the channels 49 and 54 are exhaust ports for the slide valve which are ultimately connected with the sump of the feed pump 34.

As shown in FIG. 3, abutments 55 and 56 of the centrifugal governor 44 are axially displaceably mounted on the front end of the tubular sleeve 46. Governor springs 57 and 58 are mounted between the abutments 55 and 56 concentrically with respect to the tubular sleeve 46. An adjusting fork or operating fork 59 is mounted on the abutment 56 with the interposition of a suitable antifriction bearing; the outer portion of the fork 59 is provided with a transversely extending roller 60 abutting an operating cam disk 62 mounted for rotation about a transverse axis under the bias of a spring clip 61. The cam disk 62 may be rotated about its axis by means of an actuating lever 63, which is in turn connected by means of the linkage 64 (FIG. 1) with the conventional accelerator pedal 65. A barometrically operated control expansible chamber 66 is connected by the linkage 64 with the lever 63 to provide a correction for the elevation at which the vehicle is driven. The movable abutment 55 of the cen-trifugal governor 44 drivingly engages an adjusting or slide actuating sleeve 68 that is axially displaceable concentrically within the tubular sleeve 46. The sleeve 68 is held between opposed springs 69, 70 of different length, but otherwise identical; the sleeve 68 and spring 69, 70 being concentrically mounted on an extension 71 of the spool of the slide valve 26.

An indexing sleeve 73 is secured to the free end of the extension 71, with the interposition of a ball bearing 72; the sleeve 73 being provided with three axially spaced transverse interengaging portions or grooves 74 around its circumference. The grooves 74 are spaced from each other in positions corresponding to the axial change in position of the valve slide member or spool corresponding to the three forward gear positions. Rollers or detent members 75 are carried by opposed pivotally mounted levers 76 for engaging with a selected one of the grooves 74. The levers 76 pivot about transverse pins 77, respectively, which are mounted in the housing 78 that contains the centrifugal governor 44. The levers 76 for holding the slide valve in its predetermined positions corresponding to the forward speeds, are spring urged into engagement with the sleeve 73 by means of a balance spring 79, which balance spring 79 is adjusted by means of the screws 80.

For manually overriding the automatic actuation of the slide valve 27, a manually actuated linkage 81 is provided within the tubular sleeve 46 for selective engagement with the slidable spool member of the slide valve 27 at its end opposite from the indexing sleeve 73. The linkage 81 has a stop cap 82 that is resiliently urged toward the end collar 28 of the spool for the slide valve 27 by means of a spring 83. A suitable hand lever 84, as shown in FIG. 1, is provided for moving the linkage 81 for controlling the operation of the transmission and providing for the various positions. The hand lever 84 may be held in a selected position by means of a conventional blocking or indexing device 85.

First gear is obtained from a standstill position of the vehicle by operating the hand lever 84 from the parking gear position P or the neutral position O into position III, whereby the shafting control slide valve 27 assumes the position as indicated in FIG. 1. In such a position, the pressurized fluid is conveyed by a pump 34 through pressure lines 37 and 39 into the pressure chamber D5 of the friction clutch K1 for engagement of the friction clutch K1. At the same time, the pressure chamber D4 is supplied with fluid under pressure by means of the pressure line 33 through the regulating valve 35 to thereby engage the band brake B2 to arrest and hold stationary the planet gear carrier 18 of the second planetary gear set. When the accelerator pedal 65 is pressed down, the vehicle is now set into motion and the drive is transmitted by means of the crank shaft 4 through the hydraulic torque converter 1 to the transmission input shaft 8, with the power proceeding through the clutch K1, the gear components 10, 11, 12, 13 of the planetary gear set 2, to the transmission output shaft 15. Thus, the rear wheels are driven by the transmission output shaft 15 through the conventional differential, the pinion gear 3 of which is shown in the drawings.

Figure 5:
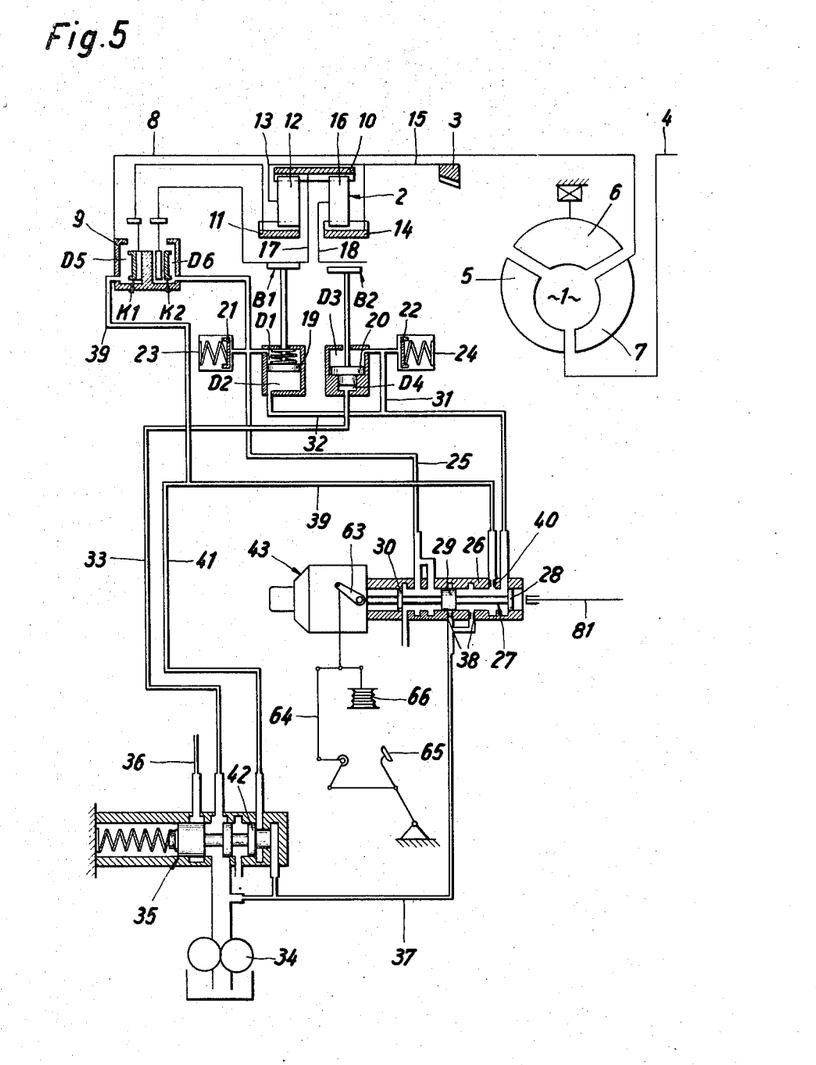
FIG. 5 is a somewhat schematic illustration of the transmission and hydraulic control in the position of second gear.

Second gear is attained by automatic operation of the transmission when the transmission output shaft 15 has reached a predetermined speed at normal driving by an appropriate acceleration of the vehicle. At this time, the centrifugal governor 44 responds and moves its abutment 55 toward the right, as seen in FIG. 3, to likewise move the sleeve 68 to the right against the force of the spring 70. After a predetermined force has been attained by the spring 70 against the end abutment at the right secured to the extension 71 sufficient to overcome the effect of the balance spring 79, corresponding to the desired shifting point, the levers 76 will pivot to move the detents 75 out of the grooves 74 of the sleeve 73. Thereafter, the spool slide member of the valve 27 will move to the right as seen in FIG. 3, until the detent rollers 75 carried on the levers 76 engage the subsequent groove on the circumference of the sleeve 73 to maintain the spool valve in its shifted position corresponding to second gear. In this new position of the slide valve 27 (FIG. 5), the pressure medium is supplied by means of the pressure lines 31 and 32 to the chamber D3 of the band brake B2 and to the engaging pressure chamber D2 of the band brake B1, with the pressure in the engaging chamber D5 of the friction clutch K1 being maintained. The pressure rises gradually within the newly supplied chambers to an extent determined by the pressure accumulators 22, 24. With hydraulic pressure being supplied at a control rate simultaneously to the disengaging chamber D3 of the piston 20 and to the engaging chamber D2 of the control piston 19, the band brake B2 is disengaged to the same extent as and simultaneously with the engagement of the band brake B1. The disengagement of the band brake B2 takes place against the pressure maintained in the disengagement chamber D4, because of the differential area of the control piston 20. The remaining chambers D1 and D6 of the respective servo units are exhausted. With the sun gear 10 being held stationary by the band brake B1, the drive for the vehicle is now provided through the transmission by way of the friction clutch K1, the ring gear 11, the planet gear 12, the planet carrier 13, and the transmission output shaft 15. The gear components 14, 16 and 18 of the planetary gear unit 2 rotate freely.

Figure 6:
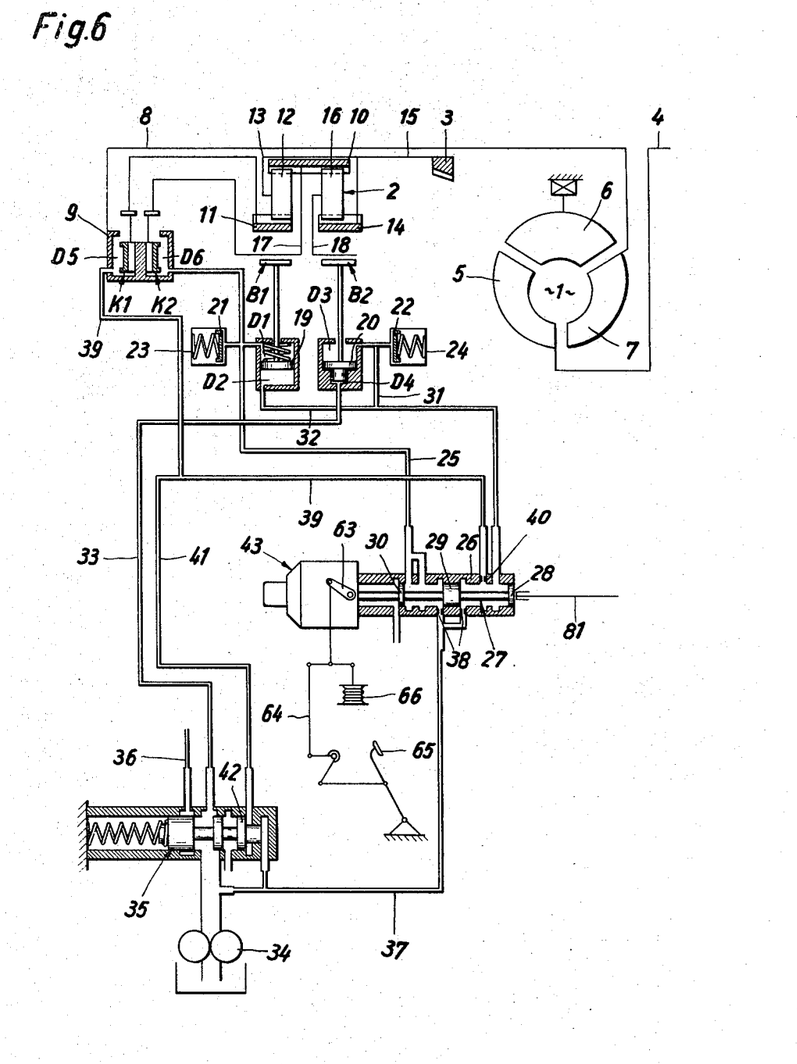
FIG. 6 is a schematic illustration of the transmission and hydraulic control in the position of third gear.

Third gear corresponding to setting III is automatically accomplished by the centrifugal governor when the sleeve 73 is further shifted toward the right in a manner analogous to that described above whereby the slide spool of the slide valve 27 assumes the position corresponding to gear shifting stage III. In this psition, which is illustrated in FIG. 6, the pressure chambers D1 of the band brake B1 and D6 of the friction clutch K2 are pressurized, in addition to the already pressurized chambers D2, D3, D4 and D5, within which pressure is maintained. The shifting of the gears is accomplished under the influence of the gradually increasing pressure in the engaging chamber D6 under the influence of the fluid pressure accumulator 21, 23 and the counter pressure in the disengagement chamber D1 of the control piston 19 for the band brake B1, which increased to the same extent. After this shifting process, the band brakes B1 and B2 are disengaged, and the two friction clutches K1 and K2 are engaged. In such a position, power is transmitted through the transmission by way of the input shaft 8, and the first planetary gear set, which is locked by the engaged clutches K1 and K2, to the transmission output shaft 15, with the second planetary gear set rotating freely.

A correction of the above automatic shifting process is attained with respect to barometric pressure and vehicle load by means of the above briefly described linkage 63, 64 connected to the accelerator pedal 65 and the barometric pressure responsive device 66. By means of this linkage, the abutment 56 of the centrifugal governor 44 is correspondingly axially shifted by means of rotating the cam disk 62 when the accelerator pedal 65 is depressed. Thereby, the initiation of the various shifting processes is shifted or corrected in accordance with the engine load. Using the same linkage, correction for driving elevation is attained in a corresponding manner with the barometric expansible chamber device 66, when the atmospheric pressure conditions change during driving in mountainous regions.

During downshifting, that is when shifting from gear ratio III to gear ratio II or from gear ratio II to gear ratio I, there is an analogous operation, particularly depessurizing or exhausting the pressure chambers D1 and D5 or D3 and D2, respectively, which is automatically regulated by the centrifugal governor 43.

The reverse transmission position is obtained by movement of the hand lever 84 through the neutral position O onto the position R (FIG. 1), whereby the slide valve 27 is positioned by means of the manual linkage 81 and the stop cap 82 overriding the automatic actuation thereof, so that the pressure chambers D1, D4 and D6 are pressurized and thus the friction clutch K2 and the band brake B2 are engaged and set, respectively. In the parking position P, all chambers D1–D6 are exhausted.

Manual control of the shifting process with respect to the three forward speeds may at times be desired, for example in mountainous regions. The hand lever 84 (FIG. 1) is moved to the position I or II, whereby the shifting control slide valve 27 is moved into a corresponding position by means of the resilient stop cap 82 so that it cannot be shifted automatically upwardly therefrom. With such an abutment employed, it is possible to upshift through the forward speeds exclusively by manual control with the aid of the linkage according to the present invention, thus eliminating the automatic effect upon the slide valve produced by the engine. In such a case, the centrifugal governor 44 attempts to initiate a shift upwardly in the forward speeds at an early stage, but the slide valve is held in the position of a lower speed by means of the abutment of the manual linkage 81 with a slight pressure. If after shifting manually upwardly through the three forward gears, the driver forgets to manually downshift from the third gear when stopping the car or traveling up a mountain, for example, where it would be desirable for the transmission to be in a lower gear, such as first gear, then the automatic shifting mechanism takes over the downshift automatically and moves the spool of the slide valve 27 to the left, shown in FIG. 3, into the positions of the lower speeds, for example, first gear. Thereby, an excess load on the transmission, particularly upon the heat sensitive torque converter, is avoided.

Figure 7:
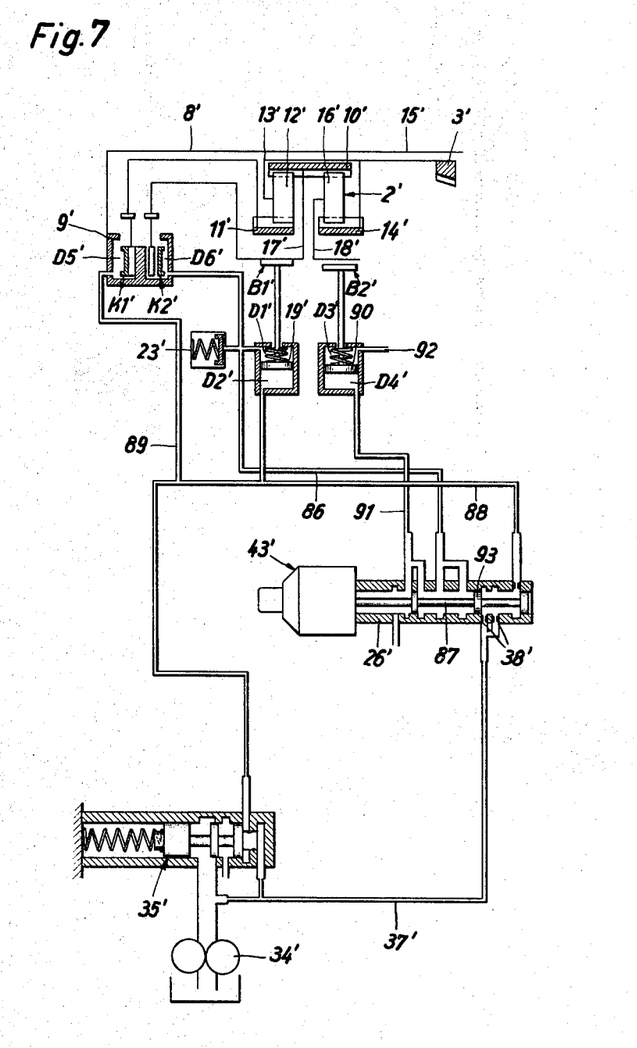
FIG. 7 is a schematic illustration of a planetary gear transmission and hydraulic control according to a simplified embodiment of the present invention.

In FIG. 7, there is illustrated a simplified version or simplified operation of the present invention for a two forward speed transmission, with the same basic structure being employed as above described with similar numerals being utilized for purposes of illustration with respect to the device of FIG. 1. Primes have been indicated to show the modification with respect to identical numerals employed for otherwise identical parts.

The clutch drum 9' is drivingly connected with the transmission input shaft 8' for the compound gear planetary transmission 2'. The drum 9' contains friction clutches K1' and K2' for driving the transmission components 10', 11', 12', 13', 14', and 16'. The transmission components 10' and 16' can be stationarily held by band brakes B1' and B2', respectively. As discussed above with respect to the first embodiment of the present invention, the rear wheels are driven by the transmission output shaft 15' by way of the differential pinion gear 3'. The band brake B1' is engaged by means of the control piston 19', which is double acting with two pressure chambers D1' and D2'. A pressure accumulator 23' is fluid connected upstream of the pressure chamber D1', which accumulator simultaneously affects the pressure in the chamber D6' of the friction clutch K2'. The pressure chambers D1' and D6' have pressure supplied to them simultaneously by a pressure line 86 terminating in the control block 26' of the gear selection spool slide valve 87, as indicated in FIG. 7. Fluid pressure is supplied to the slide valve 87 by means of the pressure line 37' from the feed pump 34'. Pressure in the other circuits is maintained constant by means of the pressure regulating valve 35'. The slide valve 87 is actuated by the shifting governor 43' corresponding to the governor illustrated in FIG. 3. The pressure chamber D2' of the band brake B1' is similarly connected to the control block 26' by means of the pressure line 88, and is connected by a branched pressure line 89 to the engaging pressure chamber D5' of the friction clutch K1'. The control piston 90 for the band brake B2' is single acting with fluid pressure being supplied only to the chamber D4' by means of the pressure line 91. The chamber D3' on the other side of the control piston 90 is provided with an exhaust port 92. The band brake B2' holds stationary the planet carrier 18' when it is engaged for reverse rotation of the transmission, that is reverse gear. The drum 17' of the common sun gear 10' is braked by means of the band brake B1'.

The shifting process for the two speed transmission according to FIG. 7 corresponds analogously to the previously described embodiment of FIG. 1. The position of the transmission as illustrated in FIG. 7 corresponds to the first gear, wherein the pressure chambers D2' and D5' are pressurized with fluid and the remaining chambers D1', D4', and D6' are exhausted. For shifting into second gear from the illustrated position, the spool portion of the slide valve 87 is moved toward the right by the automatic action of the shifting governor 43', until the control collar 93 thereof is disposed between the branches of the pressure line 37', which branches are equipped respectively with calibrated orifices 38'. In this position, fluid under pressure passes through the pressure lines 88 and 89 into the chambers D2', D5', respectively and simultaneously, by way of pressure line 86 into chambers D1' and D6'. The spring associated with the piston 19' gradually releases the band brake B1', and the friction clutch K2' is engaged while the friction clutch K1' is maintained in its engaged position. Thus, power is transmitted to the transmission by way of shafts 8' and 15' with the first planetary gear set locked and the second planetary gear set rotating freely. The corrections for barometric pressure and engine load, as well as the manual override illustrated with respect to the FIG. 1 embodiment may also be employed with the FIG. 7 embodiment and have been omitted from FIG. 7 only to simplify the disclosure. It is seen that the broad invention according to the present invention may take various specific forms and the present embodiments are for purposes of illustration with the spirit and scope of the invention being defined by the following claims.

It is claimed:

1. A change speed transmission adapted to be used for vehicles, particularly automotive vehicles, comprising: a plurality of clutch and brake coupling means controlling the gear ratio of the transmission; a plurality of piston-cylinder servo means respectively actuating said coupling means; one of said servo means actuating one of said brake coupling elements and being provided with two opposed fluid pressure chambers, one of said chambers being directly fluid connected to fluid pressure accumulator means and to one side of the piston of a second one of said servo means actuating one of said clutch coupling element; a source of fluid pressure selectively connectable with said servo means; a valve means operatively connected with said source and associated with the transmission output shaft so as to be shiftable in dependence upon the speed of the output drive of the transmission and a power control member for the vehicle engine operatively associated with said valve means for actuating said coupling servo means to determine the transmission gear ratios; the other of said one brake coupling servo means pressure chamber being fluid connectable with one side of the piston of a third one of said coupling servo means, indexing means for holding said valve means in one of a plurality of predetermined operative positions; and manually operated means for selectively overriding the automatic operation of said valve means.

2. A change speed transmission adapted to be used for vehicles, particularly automotive vehicles, comprising: a plurality of clutch and brake coupling means controlling the gear ratio of the transmission; a plurality of piston-cylinder servo means respectievly actuating said coupling means; one of said servo means actuating one of said brake coupling elements and being provided with two opposed fluid pressure chambers, one of said chambers being directly fluid connected to fluid pressure accumulator means and to one side of the piston of a second one of said servo means actuating one of said clutch coupling elements; a source of fluid pressure selectively connectable with said servo means; a valve means operatively connected with said source and associated with the transmission output shaft so as to be shiftable in dependence upon the speed of the output drive of the transmission and a power control member for the vehicle engine operatively associated with said valve means for actuating said coupling servo means to determine the transmission gear ratios; the other of said one brake coupling servo means pressure chamber being fluid connectable with one side of the piston of a third one of said coupling servo means; indexing means for holding said valve means only in a plurality of predetermined definite operative positions; and valve actuating means comprising opposed springs respectively between an intermediate abutment and two end abutments, at least one of said abutments being selectively shiftable to change the spring bias on a second one of said abutments and said second one of said abutments being drivingly connected to said valve means for shifting it between its operative positions.

3. A change speed transmission adapted to be used for vehicles, particularly automotive vehicles, comprising: a plurality of clutch and brake coupling means controlling the gear ratio of the transmission; a plurality of piston-cylinder servo means respectively actuating said coupling means; one of said servo means actuating one of said brake coupling elements and being provided with two opposed fluid pressure chambers, one of said chambers being directly fluid connected to fluid pressure accumulator means and to one side of the piston of a second one of said servo means actuating one of said clutch coupling elements; a source of fluid pressure selectively connectable with said servo means; a valve means operatively connected with said source and associated with the transmission output shaft so as to be shiftable in dependence upon the speed of the output drive of the transmission and a power control member for the vehicle engine operatively associated with said valve means for actuating said coupling servo means to determine the transmission gear ratios; the other of said one brake coupling servo means pressure chamber being fluid connectable with one side of the piston of a third one of said coupling servo means, wherein said coupling means include at least two friction clutches and two band brakes; the servo means actuating said band brakes each being double acting piston-cylinders with engaging and disengaging pressure chambers; said valve means being selectively operable to selectively fluid connect the pressure chambers of a first one of said brake servo means respectively with the servo means for one of said friction clutches to engage said one friction clutch and with a pressure chamber of the servo means of the second band brake; means for regulating the pressure of said fluid source to a constant pressure; the other pressure chamber of the servo means of the second band brake being directly fluid connected with said source of fluid pressure only through said pressure regulating means bypassing said valve means.

4. The transmission according to claim 3, indexing means for holding said valve means in one of a plurality of predetermined operative positions; manually operated means for selectively overriding the automatic operation of said valve means.

5. The transmission according to claim 3, line means fluid connected in series said source of fluid pressure, said valve means and the disengaging pressure chamber of at least one of said brake coupling servo means, in order; said fluid pressure accumulator means directly fluid connected with said line means between said valve means and said disengaging pressure chamber associated therewith.

6. The transmission according to claim 3, said servo means of said second band brake having a differential area double acting piston with pressure acting upon the smaller area side of the piston being operable in the direction of brake engagement.

7. The transmission according to claim 6, indexing means for holding said valve means in one of a plurality of predetermined operative positions; manually operated means for selectively overriding the automatic operation of said valve means.

8. The transmission according to claim 6, line means fluid connecting in series said source of fluid pressure, said valve means and the disengaging pressure chamber of at least one of said brake coupling servo means, in order; said fluid pressure accumulator means directly fluid connected with said line means between said valve means and said disengaging pressure chamber associated therewith.

9. The transmission according to claim 8, indexing means for holding said valve means in one of a plurality of predetermined operative positions; manually operated means for selectively overriding the automatic operation of said valve means.

10. The transmission according to claim 8, said fluid pressure accumulator means being directly fluid connected with the engaging pressure chamber of one of said clutch servo means simultaneously with the direct connection with said line means.

11. The transmission according to claim 10, indexing means for holding said valve means in one of a plurality of predetermined operative positions; manually operated means for selectively overriding the automatic operation of said valve means.

12. The transmission according to claim 10, a second pressure accumulator means in direct fluid connection between the disengaging pressure chamber of the other of said brake servo means and said valve means, and simultaneously being directly fluid connected with the engaging pressure chamber of the other of said clutch servo means.

13. The transmission according to claim 12, indexing means for holding said valve means in one of a plurality of predetermined operative positions; manually operated means for selectively overriding the automatic operation of said valve means.

14. The transmission according to claim 3, pressure regulating means; said source of fluid pressure being directly connected to said valve means bypassing said pressure regulator means.

15. The transmission according to claim 14, indexing means for holding said valve means in one of a plurality of predetermined operative positions; manually operated means for selectively overriding the automatic operation of said valve means.

16. The transmission according to claim 14, including a plurality of calibrated orifices fluid interposed between said source of fluid pressure and said valve means for controlling the shifting periods.

17. The transmission according to claim 3, indexing means for holding said valve means only in a plurality of predetermined definite operative positions; valve actuating means comprising opposed springs respectively between an intermediate abutment and two end abutments, at least one of said abutments being selectively shiftable to change the spring bias on a second one of said abutments and said second one of said abutments being drivingly connected to said valve means for shifting it between its operative positions.

18. The transmission according to claim 17, centrifugal governor means for selectively shifting said one of said abutments and being provided with governor abutment and spring means operatively mounted between said one abutment and said governor abutment for biasing said one abutment in one direction; means for shifting said governor abutment in said one direction in dependence upon engine load to change the bias of said spring means.

19. The transmission according to claim 17, wherein said indexing means includes an indexing member drivingly connected with said valve means for movement therewith between its operative positions and having a plurality of aligned transverse interengaging portions and a spring urged cam member operatively interengaging with an adjacent separate one of said interengaging portions for each valve means operative position.

20. The transmission according to claim 17, indexing means for holding said valve means in one of a plurality of predetermined operative positions; manually operated means for selectively overriding the automatic operation of said valve means.

References Cited

UNITED STATES PATENTS

| | | | |
|---|---|---|---|
| 1,921,459 | 8/1933 | Erban | 74—865 |
| 2,260,406 | 10/1941 | Roche | 74—865 |
| 2,376,545 | 5/1945 | Livermore | 74—865X |
| 2,689,029 | 9/1954 | McFarland | 74—752X |
| 2,697,363 | 12/1954 | Sheppard | 74—868 |
| 2,761,328 | 9/1956 | Herndon et al. | 74—869 |
| 2,950,629 | 8/1960 | Holdeman et al. | 74—869X |
| 3,237,476 | 3/1966 | Jandasek | 74—868 |
| 3,313,173 | 4/1967 | Szodfridt et al. | 74—865 |

FOREIGN PATENTS

| | | | |
|---|---|---|---|
| 842,270 | 2/1939 | France | 74—865 |

CARLTON R. CROYLE, Primary Examiner

T. C. PERRY, Assistant Examiner

U.S. Cl. X.R.

74—867